US006047677A

United States Patent [19]

Kim

[11] Patent Number: 6,047,677

[45] Date of Patent: Apr. 11, 2000

[54] INTAKE SYSTEM WITH NOISE REDUCTION STRUCTURE

[75] Inventor: Tae-joung Kim, Kyungki-do, Rep. of Korea

[73] Assignee: Hyundai Motor Company, Seoul, Rep. of Korea

[21] Appl. No.: 09/211,298

[22] Filed: Dec. 14, 1998

[51] Int. Cl.[7] .................... F02B 75/18

[52] U.S. Cl. .................... 123/184.55

[58] Field of Search .................... 123/184.55, 184.53; 181/204, 206

[56] References Cited

U.S. PATENT DOCUMENTS

| | | | |
|---|---|---|---|
| 4,862,840 | 9/1989 | Matsunaga et al. | 123/184.55 |
| 5,309,883 | 5/1994 | Pischke | 123/184.55 |
| 5,628,287 | 5/1997 | Brackett et al. | 123/184.55 |
| 5,787,851 | 8/1998 | Sakurai et al. | 123/184.55 |
| 5,813,380 | 9/1998 | Takahashi et al. | 123/184.55 |

FOREIGN PATENT DOCUMENTS

| | | | |
|---|---|---|---|
| 001663210 | 7/1991 | U.S.S.R. | 123/184.55 |

*Primary Examiner*—Marguerite McMahon
*Attorney, Agent, or Firm*—Christie, Parker & Hale, LLP

[57] ABSTRACT

An intake system for an engine includes an air duct for inducing external air, a surge tank for suppressing pulsation of the induced external air and supplying the air to a combustion chamber of the engine, and a silencer system disposed between the air duct and the surge tank to reduce noise generated during an expansion stroke within a combustion chamber and backwardly transmitted to the intake system. The silencer system has a first tube connecting the air duct and the surge tank, a second tube separated from the first tube and connecting the air duct and the surge tank, and a device for varying a length of the second tube in accordance with an engine RPM such that a sound frequency of the noise passing through the second tube has a phase opposite to that passing through the first tube, whereby the sound frequencies are offset when combined at the air duct.

6 Claims, 1 Drawing Sheet

INTAKE SYSTEM WITH NOISE REDUCTION STRUCTURE

BACKGROUND OF THE INVENTION (a) Field of the Invention

The present invention relates to an intake system of automotive engines and, more particularly, to an intake system with a noise reduction structure which can reduce noise generated during an expansion stroke within a combustion chamber and backwardly transmitted to the intake system (this noise will be referred to as "explosive noise" hereinafter).

(b) Description of the Related Art

FIG. 1 shows a conventional intake system for an automotive engine.

The conventional intake system comprises an air duct 1 for inducing external air, an air filter (not shown) disposed within the air duct 1 for filtering impurities contained within the induced external air, and a surge tank 2 for suppressing pulsation of the induced air then distributing the same to an intake manifold (not shown). The induced air passing through the intake manifold is mixed with fuel, then finally fed to a combustion chamber.

Explosive noise within a range of 100 Hz–1.6 kHz is generated during an expansion stroke of the engine, then flowed backward to the intake system. However, since the conventional intake system has no means to reduce the explosive noise, the explosive noise backwardly transmitted to the intake system results in deteriorating overall ride comfort.

SUMMARY OF THE INVENTION

Therefore, the present invention has been made in an effort to solve the above-described problems.

It is an objective of the present invention to provide an intake system with a noise reduction structure which can reduce explosive noise generated during an expansion stroke within a combustion chamber and flowing backward to the intake system.

To achieve the above objective, the present invention provides an intake system for an engine comprising an air duct for inducing external air a surge tank for suppressing pulsation of the induced external air and supplying the air to a combustion chamber of the engine, and a silencer system disposed between the air duct and the surge tank to reduce noise generated during an expansion stroke within a combustion chamber and backwardly transmitted to the intake system. The silencer system comprises a first tube connecting the air duct and the surge tank, a second tube separated from the first tube and connecting the air duct and the surge tank, and means for varying a length of the second tube in accordance with an engine RPM such that a sound frequency of the noise passing through the second tube has a phase opposite to that passing through the first tube, whereby the sound frequencies are offset when combined at the air duct.

According to a feature of the present invention, the second tube comprises first and second sections extending from the surge tank and the air duct, respectively, and a third section slidably connected to the first and second sections such that the length of the second tube is variable.

According to another feature of the present invention the means comprises an actuator for slidably moving the third section of the second tube an electronic control unit for controlling an operation of the actuator and an RPM sensor for detecting an engine RPM and transmitting a corresponding signal to the electronic control unit.

In is another objective of the present invention to provide a silencer system that can be applied to any parts subject to noise.

To achieve this objective, the present invention provides a silencer system for reducing noise transmitting from an upstream duct to a downstream duct, the silencer comprising a first tube connecting the upstream duct to the downstream duct, a second tube separated from the first tube and connecting the upstream duct to the downstream duct, means for varying a length of the second tube in accordance with an engine RPM such that a sound frequency of the noise passing through the second tube has a phase opposite to that passing through the first tube, whereby the sound frequencies are offset when combined at the downstream duct.

BRIEF DESCRIPTION OF THE DRAWINGS

The accompanying drawings, which are incorporated in and constitute a part of the specification, illustrate an embodiment of the present invention, and together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 1:
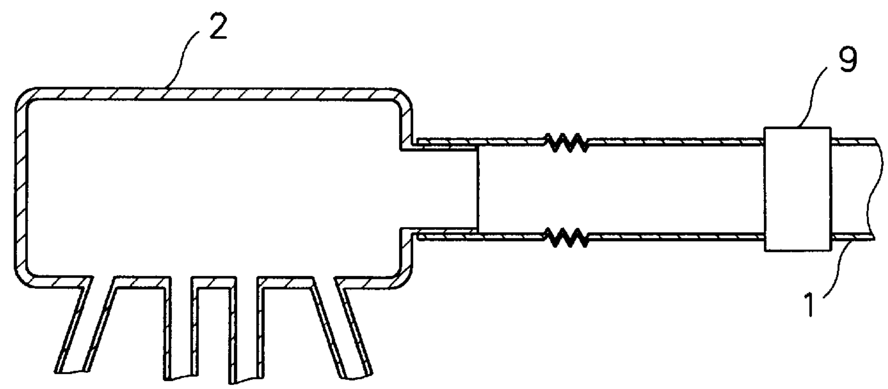
FIG. 1 is a schematic diagram of a conventional intake system for an automotive engine.
Figure 2:
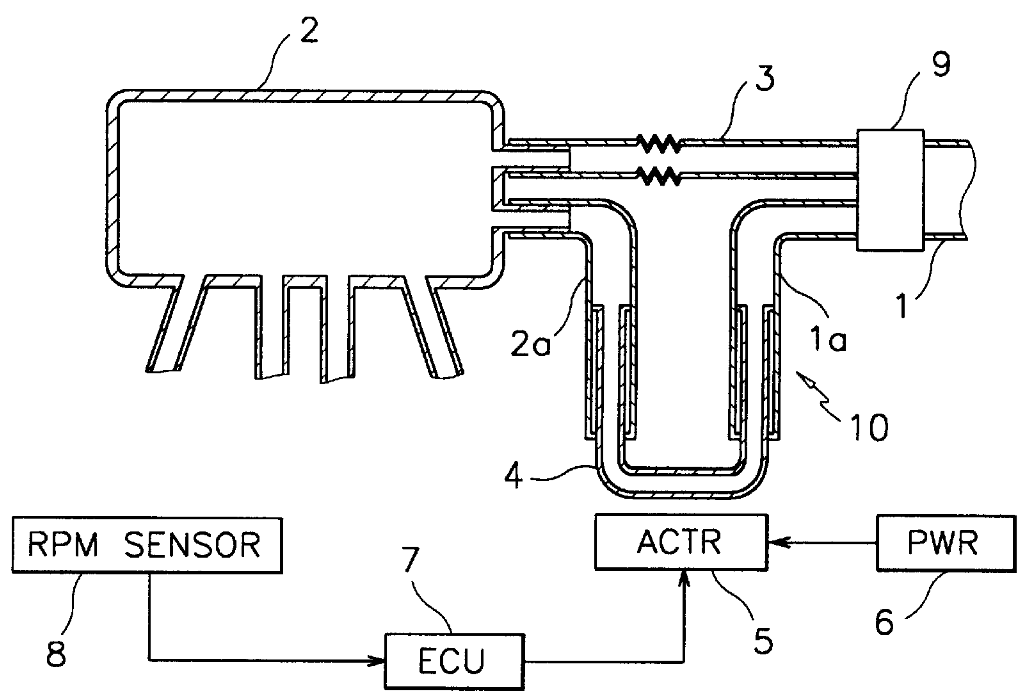
FIG. 2 is a schematic diagram of an intake system according to a preferred embodiment of the present invention.

Referring to FIG. 2, there is shown a schematic diagram of an intake system with a noise reduction system according to a preferred embodiment of the present invention.

As shown in the drawing, the inventive intake system comprises an air duct 1 for inducing external air and a surge tank 2 for suppressing pulsation of the induced air. The surge tank 2 is connected to the air duct 1 via a straight tube 3.

As a feature of the present invention, provided to the intake system of the present invention is a silencer system for reducing explosive noise generated during an expansion stroke within a combustion chamber and backwardly transmitted to the intake system.

The silencer system comprises a length variable tube 4 connected between the air duct 1 and the surge tank 2, an actuator 5 for varying the length of the variable tube assembly 10, a power source 6 for operating the actuator 5, an electronic control unit 7 for controlling the operation of the actuator 5, an RPM sensor 8 for detecting engine RPM and transmitting a corresponding signal to the electronic control unit 7.

The variable tube assembly 10 comprises a first tube 1*a* branched off from the air duct 1 and bent in a perpendicular direction, a second tube 2*a* extending from the surge tank 2 and bent downward, and a U-shaped tube 4, opposite ends of which are slidably inserted into the first and second tubes 1*a* and 2*a*, respectively. The sliding movement of the U-shaped tube 4 is realized by the actuator 5.

The actuator 5 is controlled by the electronic control unit 7 that receives RPM signals from the RPM sensor 8.

That is, information on effective lengths of the variable tube assembly 10 in accordance with engine RPM is stored in the electronic control unit 7. Therefore, the electronic control unit 7 operates the actuator 5 according to an RPM signals transmitted from the RPM sensor 8 such that the U-shaped tube 4 slides until the length of the variable tube assembly 10 changes to an effective length corresponding to the transmitted RPM signal.

Describing more in detail, since sound frequencies of the explosive noise vary according to various ranges of engine RPM, the effective lengths of the variable tube assembly 10 at each engine RPM is determined such that the sound frequency of the explosive noise passing through the variable tube assembly 10 has a phase opposite to that passing through the straight tube 3. Theses determined effective lengths are preset in the electronic control unit 7. Accordingly, the two sound frequencies are offset when they are combined at the air duct 1.

The operation of the present invention will be described more in detail hereafter.

When the vehicle is accelerating, high explosive noise reversely flows from the combustion chamber to the intake system. At this point, the electronic control unit 7 determines the sound frequency of the noise on the basis of signals transmitted from the RPM sensor 8 and controls the operation the actuator 5.

The actuator 5 adjusts the length of the variable tube assembly 10 by slidably moving the U-shaped tube 4 along the first and second tubes 1*a* and 2*a* such that a sound frequency of the explosive noise passing through the variable tube assembly 10 has a phase opposite to that passing through the straight tube 3.

That is, the explosive noise generated within the chamber of the engine is reversely directed to the surge tank 2, then divided into two opposite-phase sound frequencies after leaving the surge tank 2 respectively in the straight tube 3 and the variable tube assembly 10. Finally, the two opposite-phase frequencies are converged at the air duct 1, thereby offsetting each other.

Reference numeral 9 that is not described denotes an airflow sensor for detecting a speed of an intake air.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

For example, the silencer system according to the present invention may be applied to, for example, an exhaust system and other areas subjected to engine noise.

What is claimed is:

1. A silencer system for reducing noise transmitting from an upstream duct to a downstream duct, the silencer comprising:

a first tube connecting the upstream duct to the downstream duct;

a second tube separated from the first tube and connecting the upstream duct to the downstream duct;

means for varying a length of the second tube in accordance with an engine RPM such that a sound frequency of the noise passing through the second tube has a phase opposite to that passing through the first tube, whereby the sound frequencies are offset when combined at the downstream duct.

2. The silencer system of claim 1 wherein the second tube comprises first and second sections extending from the upstream and downstream ducts, respectively, and a third section slidably connected to the first and second sections such that the length of the second tube is variable.

3. The silencer system of claim 2 wherein the means comprises an actuator for slidably moving the third section of the second tube, an electronic control unit for controlling an operation of the actuator, and an RPM sensor for detecting an engine RPM and transmitting a corresponding signal to the electronic control unit.

4. An intake system for an engine comprising:

an air duct for inducing external air;

a surge tank for suppressing pulsation of the induced external air and supplying the air to a combustion chamber of the engine; and a silencer system disposed between the air duct and the surge tank to reduce noise generated during an expansion stroke within a combustion chamber and backwardly transmitted to the intake system, wherein the silencer system comprises:

a first tube connecting the air duct and the surge tank;

a second tube separated from the first tube and connecting the air duct and the surge tank; and means for varying a length of the second tube in accordance with an engine RPM such that a sound frequency of the noise passing through the second tube has a phase opposite to that passing through the first tube, whereby the sound frequencies are offset when combined at the air duct.

5. The silencer system of claim 4 wherein the second tube comprises first and second sections extending from the surge tank and the air duct, respectively, and a third section slidably connected to the first and second sections such that the length of the second tube is variable.

6. The silencer system of claim 5 wherein the means comprises an actuator for slidably moving the third section of the second tube, an electronic control unit for controlling an operation of the actuator, and an RPM sensor for detecting an engine RPM and transmitting a corresponding signal to the electronic control unit.

* * * * *